United States Patent [19]

Garrison et al.

[11] 4,390,092

[45] Jun. 28, 1983

[54] ANTI-SLIP BALE THROWER

[75] Inventors: Harold K. Garrison, Newton; Howard J. Ratzlaff, Hesston, both of Kans.

[73] Assignee: Hesston Corporation, Hesston, Kans.

[21] Appl. No.: 48,342

[22] Filed: Jun. 14, 1979

[51] Int. Cl.³ .......................................... B65G 31/02
[52] U.S. Cl. ................................. 198/638; 198/628
[58] Field of Search .............. 198/638, 639, 640, 641, 198/628, 627

[56] References Cited

U.S. PATENT DOCUMENTS 3,168,189  2/1965  Luedtke ......................... 198/628 X
3,386,564  6/1968  Pease ................................... 198/627
4,162,725  7/1979  Smith et al. ..................... 198/638 X Primary Examiner—James L. Jones, Jr.
Assistant Examiner—Douglas D. Watts
Attorney, Agent, or Firm—Schmidt, Johnson, Hovey & Williams

[57] ABSTRACT

The thrower is attached to the discharge end of a baler in position to receive bales successively issuing therefrom. A pair of generally superimposed conveyors of the thrower operate at relatively high speeds compared to the speed at which the bales issue from the baler, and as the leading end of each bale enters the awaiting thrower, the high speed conveyors grab the bale and propel it upwardly and rearwardly toward an awaiting receptacle such as a trailing wagon. The upper conveyor is so mounted that it clamps down in a self-actuating manner against the bale as the latter enters the thrower and makes engagement with the propelling surfaces of the conveyors, such clamping action arising from the reaction force generated by the slowly moving bale contacting the rapidly moving surface of the upper conveyor.

8 Claims, 4 Drawing Figures

4,390,092

ANTI-SLIP BALE THROWER

TECHNICAL FIELD

This invention relates to attachments to agricultural balers and, more particularly to attachments in the form of throwers for propelling bales that issue from such balers into trailing receptacles or the like as opposed to allowing the bales to fall to the ground.

BACKGROUND ART

Bale throwers typically employ a pair of high speed, laterally spaced conveyors that receive bales issuing from the baler to which the thrower is attached. As each bale enters the thrower, the rapidly moving conveyors grip the bale, pull it from the baler, and propel it upwardly and rearwardly through the air to a trailing wagon or the like. Not infrequently, however, the conveyors may fail to adequately grip a bale at first engagement such that, instead of propelling the bale through the thrower, they literally tear the leading end of the bale apart as it sits substantially motionless at the entry end of the thrower.

SUMMARY OF THE PRESENT INVENTION

Accordingly, the present invention has as its principal object to provide a way of causing the conveyors to clamp tightly against each bale as it enters the thrower so that, regardless of such factors as dimensional variations in the bales, their degree of "slickness" due to moisture conditions and crop varieties, etc., the thrower will firmly grip and control each bale on an independent basis and without substantial slippage to avoid problems heretofore prevalent in the art.

Pursuant to the foregoing, the present invention utilizes an arrangement in which the top conveyor of the thrower is swingably associated with the lower conveyor in a four-bar linkage arrangement such that when a bale enters the thrower and makes initial engaging contact with the upper conveyor, the reaction force generated between the rapidly moving conveyor and the slow moving bale causes the upper conveyor to swing rearwardly with respect to the direction of bale travel and downwardly toward the opposite conveyor so as to firmly clamp the bale against the opposite conveyor. Once the conveyors have so clamped the bale, all of their driving forces can be utilized to propel the bale on through the conveyor and upwardly through the air toward an awaiting receptacle of suitable nature.

DETAILED DESCRIPTION

The baler 10 is provided with a discharge chute 12 normally extending in a fore-and-aft direction with respect to the path of travel of the baler 10. The bale thrower 14 of the present invention is attached to the baler 10 at the rear end of the chute 12 for receiving bales therefrom in succession and for throwing such bales upwardly and rearwardly toward a trailing wagon or the like (not shown) which may be hitched to the baler 10 via a fore-and-aft extending tongue 16.

Figure 2:
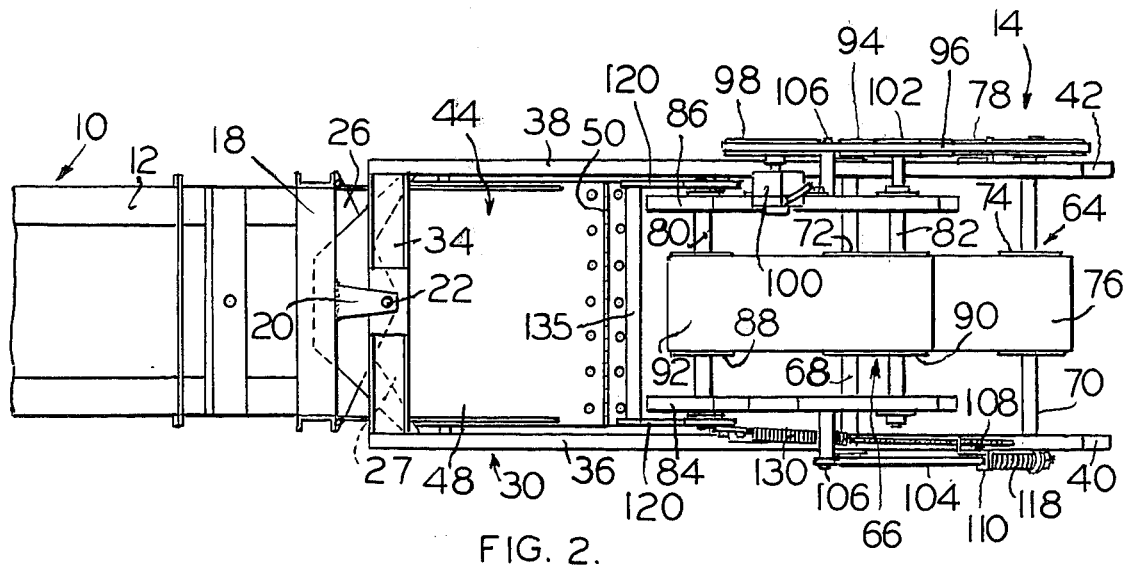
FIG. 2 is a top plan view thereof.

The chute 12 has a rectangular open frame 18 attached to the rear end thereof, said frame being aligned with the discharge opening of the chute 12 such as to avoid interference with bales issuing therethrough. A pair of upper ears 20 project rearwardly from the frame 18 and support a vertical pivot 22 aligned vertically with a corresponding lower pivot 24 which in turn interconnects an ear 26 projecting rearwardly from frame 18 at the lower end thereof and an ear 27 projecting forwardly from thrower 14. Pivots 22 and 24 are centered with respect to the lateral confines of the baler 10 as illustrated most clearly in FIG. 2. The thrower 14 is attached to the baler 10 via the pivots 22,24 such that the thrower 14 can swing about the axis of pivots 22,24 as may be required to adjust the "aim" of the thrower 14 when the baler 10 and its trailing wagon are cornering, for example. A hydraulic cylinder or the like (not shown) may be connected between the baler 10 and a depending lug 28 on the frame 30 of the thrower 14 for effecting the desired adjustment of the thrower 14.

Frame 30 includes a pair of uprights 32 (only one being shown) situated on opposite sides of the path of travel of the bale issuing from chute 12, a transverse top member 34 (FIG. 2) spanning the uprights 32 slightly forwardly thereof, a pair of upper side members 36 and 38 extending rearwardly from the opposite ends of transverse members 34, and a pair of upwardly and rearwardly inclined beams 40 and 42 attached at their lower ends to the lower extremities of uprights 32 and intersecting the side members 36,38 at their rear extremities. Thus, the frame 30 is of generally open construction providing room for bales to pass therethrough from the discharge chute 12.

A specially constructed floor 44 fits within the frame 30 in disposition to receive bales issuing from the chute 12 and to either direct the same upwardly through the conveying portion of the thrower 14 or downwardly to the ground, depending upon the adjusted position of the floor 44. In this regard, the floor 44 includes two sections 46 and 48 swingably interconnected by a transverse hinge 50, each of the sections 46,48 being unobstructed at its respective opposite ends but having upturned side portions. The front section 48 is swingably attached to the uprights 32 by a pivot 52 on each upright 32, and section 48 projects forwardly beyond its pivots 52 substantially to the rearmost end of the chute 12. A rod 54 (FIG. 1) may be selectively placed either in the normal position in which it spans beams 36,38 and underlies the rear of floor 44 or in an alternative position illustrated by a hole 56 in each of the beams 40,42 each such hole 56 being situated a distance below and substantially forwardly of the normal position of the rod 54. The floor 44 is slightly buckled when its rear end rests upon the rod 54, such buckling being limited by a stop 58 interposed between the two sections 46,48. If it is desired for the floor 44 to assumes its dotted line position of FIG. 1, the rod 54 is removed from its normal position and reinserted into the holes 56 so that it is then in position to underlie the front section 48 of the floor 44 when the latter swings down to its alternative position. Limit chains 60 connected between the bolts 62 on the beams 40,42 and the rearmost extremity of the rear section 46 suspend the latter from the beams 40,42 when the floor 44 is in its dotted line position, the chains 60 hanging harmlessly between the bolts 62 and the section 46 during the time that the floor 44 is in its normal, upwardly located position.

The thrower 14 also includes a pair of superimposed conveyors 64 and 66 disposed to receive the bales from the floor 44 when the latter is in its normal, raised position. The lower conveyor 64 includes a pair of shafts 68 and 70 journaled by the beams 40,42 at longitudinally spaced locations along the latter. The shafts 68 and 70 completely span the beams 40,42 and carry centrally disposed respective guide rolls 72,74 which are, in turn, entrained by a flat, endless belt 76 having an uppermost bale-engaging surface driven in an upward and rearward direction via a driven sheave 78 that is fixed to the projecting end of the shaft 70 adjacent the beam 42.

The upper conveyor 66 similarly includes a pair of shafts 80 and 82 that are spaced apart in a longitudinal direction with respect to the path of bale travel through the thrower 14 and which span a pair of sidebars 84,86 extending in generally parallel relationship to one another and to the lower conveyor 64. Sidebars, 84,86 journal the shafts 80,82 for rotation, and the latter carry respective, centrally disposed guide rolls 88,90 that are substantially registered with the corresponding rolls 72,74 of the lower conveyor 64. An endless, flat belt 92 entrains the rolls 88,90 and is provided with a lower bale-engaging surface normally driven in an upward and rearward direction by a driven sheave 94 affixed to the projecting end of the shaft 82 adjacent the sidebars 86.

The sheave 94 receives its power via an endless belt 96 that entrains a drive sheave 98 which is itself powered by a hydraulic motor 100 carried by the sidebar 86. The belt 96 further entrains a spring-loaded tensioning idler 102, plus the driven sheave 78 associated with the lower conveyor 64.

The two conveyors 64 and 66 are coupled in a special four-bar linkage relationship. To this end, each side of the thrower 14 is provided with a first connecting link 104 extending generally perpendicular to the conveyors 64,66 on opposite lateral sides thereof and pivotally interconnecting the sidebar 84 with the beam 40 on the one hand and the sidebar 86 and the beam 42 on the other hand. An upper pivot 106 for each link 104 pivotally connects the upper end thereof with the corresponding sidebar 84 or 86, while a lower pivot 108 pivotally connects the lower end portion of each link 104 with the corresponding beam 40 or 42. Each lower pivots 108 carries a generally L-shaped bracket 110 whose laterally outwardly projecting leg 112 is perforated so as to slidably receive the link 104. A stop 113 is welded to the link 104 above the leg 112 so as to limit downward travel of the link 104, and an elastomeric pad 115 may be provided between the stop 113 and leg 112 if desired. The lowermost end of the link 104 is threaded such as to accept one or more locking nuts 114 which, together with a washer 116 confine a coiled compression spring 118 against the leg 112 of the bracket 110, the spring 118 receiving the link 104 within the tubular interior thereof. Hence, the spring 118 yieldably biases the upper conveyor 66 toward the lower conveyor 64 to the extent permitted by stops 113.

The four-bar linkage above referred to further includes a second connecting link 120 for each side of the thrower 14, the link 120 on the left side of the thrower 14 (as viewed from the rear thereof) taking the form of a belt crank for reasons which will subsequently be made apparent. Each link 120 is connected to a pivot 122 at its lower end to an upstanding lug 124 on the corresponding member 36 or 38 and has an upper pivot 126 with a forwardly extending portion of the corresponding sidebar 84 or 86. A stop 128 projects into the path of travel of a rearward edge 120a of each link 120 and is mounted on the upstanding lug 124 such that swinging movement of the links 120 is limited in one direction to the extent permitted by the stops 128.

In view of the fact that the links 104 and 120 each pivotally interconnect the conveyors 64 and 66, a four-bar linkage relationship is established in which the lower conveyor 64 with its beams 40,42 its members 36,38 and its lugs 124 forms one bar of the linkage, the links 104 form a second bar of the linkage, the sidebars 84,86 form a third bar of the linkage, and the links 120 form the fourth bar of the linkage.

Figure 3:
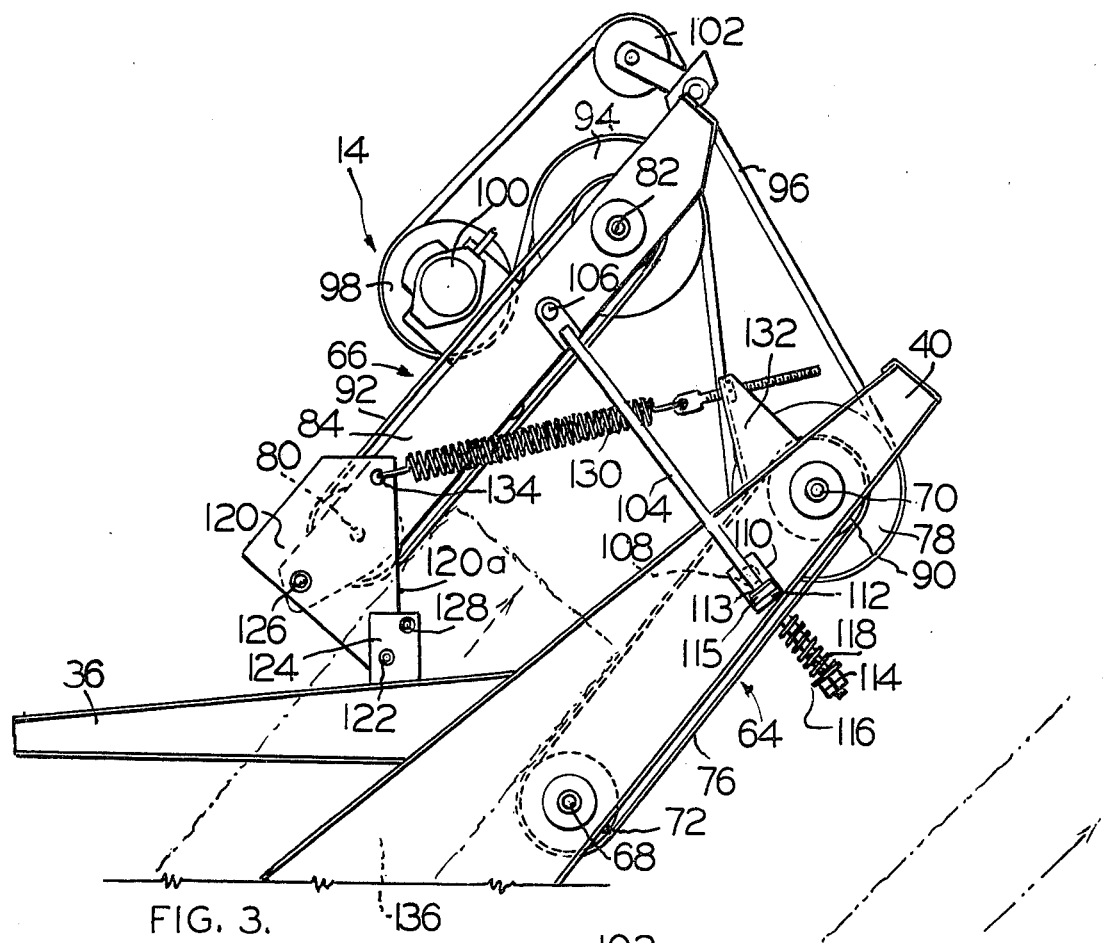
FIG. 3 is a slightly enlarged, fragmentary, side elevational view of the thrower illustrating the condition of things as a bale enters the thrower.

A tension spring 130 on the left side only of thrower 14 is stretched between a rearward anchor point such as an upstanding lug 132 on beam 40 or 42 and a forward connecting point 134 on the corresponding link 120. The connecting point 134 is selected to be in cranked relationship to the lever arm defined by a line between the pivots 122 and 126 such that the spring 130 tends to swing its link 120 about the pivot 122 in a clockwise direction viewing FIGS. 3 and 4. Inasmuch as the links 120 are rigidly interconnecting by a tongue member 135, the spring 130 biases both links 120 against stop 128 such that, normally, the conveyors 64,66 are maintained in their relatively spaced apart condition of FIG. 3 yet can be caused to shift relatively toward one another toward the position illustrated in FIG. 4 under circumstances that will now be explained.

OPERATION

Figure 1:
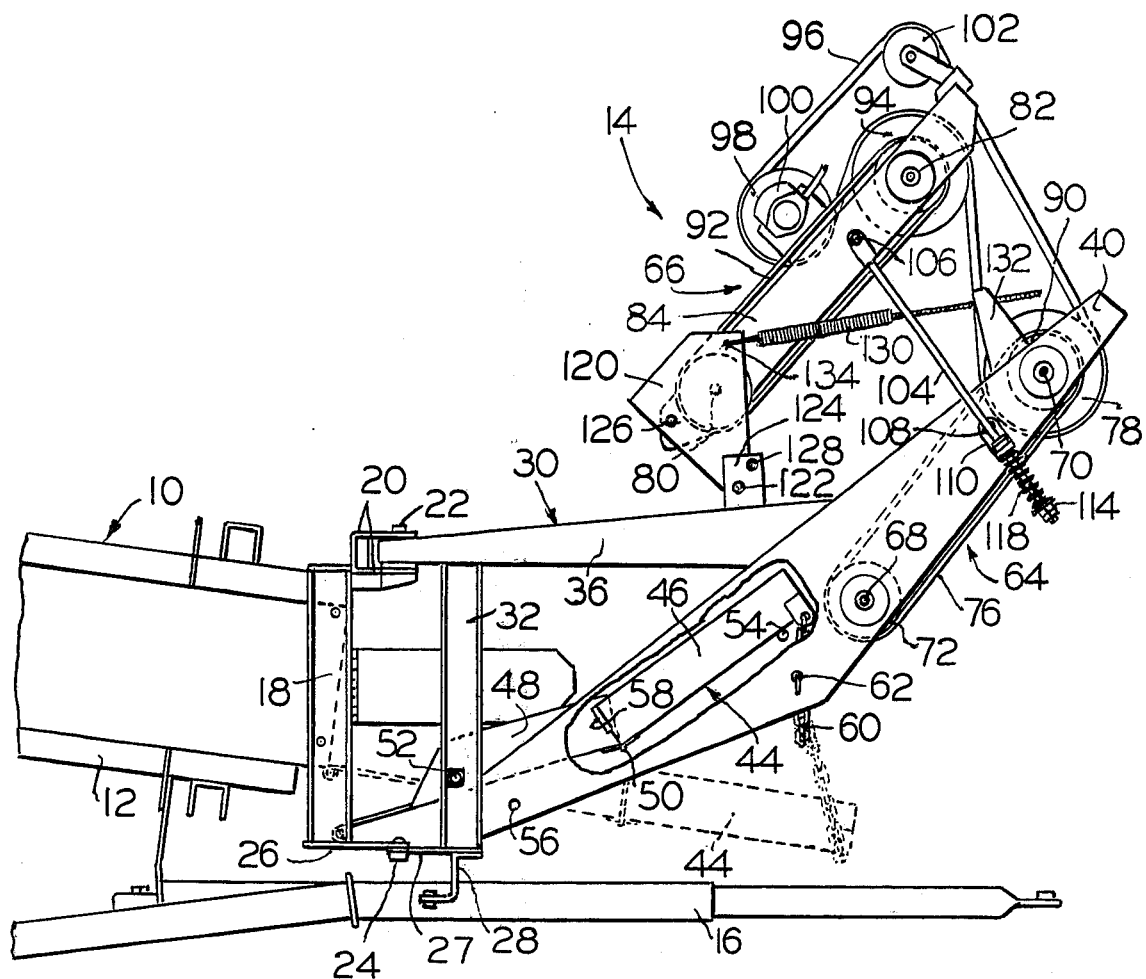
FIG. 1 is a side elevational view of a bale thrower constructed in accordance with the principles of the present invention and attached to the discharge end of a typical baler, the baler being fragmentarily shown, and phantom lines being used to illustrate an alternative position for the bale-directing ramp of the thrower for discharging the bales directly onto the ground instead of sending them upwardly through the thrower.
Figure 4:
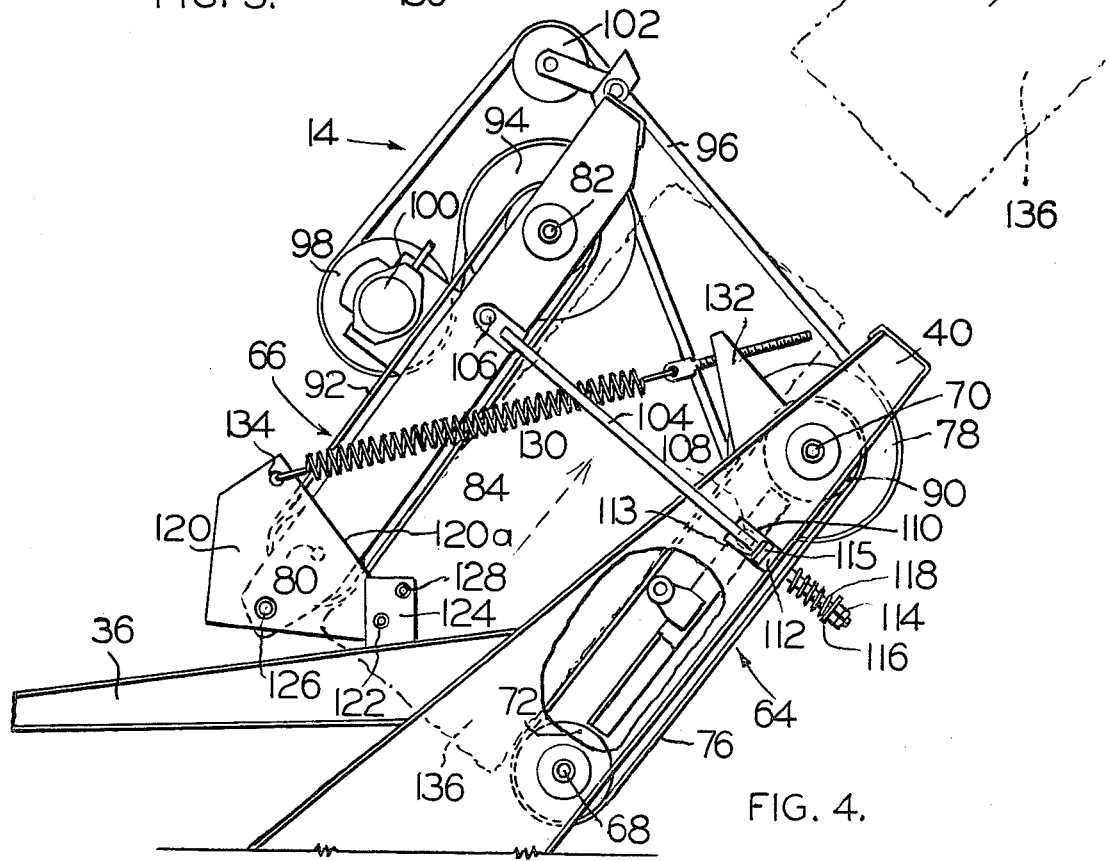
FIG. 4 is a side elevational view similar to FIG. 3 illustrating the way in which the top conveyor swings down into clamping engagement with the bale during the latter's travel through the thrower.

When the floor 44 is raised to its throwing position as illustrated in solid lines in FIG. 1, bales emanating from the chute 12 will be successively inched up the floor 44. The leading end of the rearmost bale will thereupon enter the thrower 14 in the manner illustrated in FIG. 3 wherein such bale is denoted by the numeral 136. Bearing in mind that the lower surface of upper conveyor 66 and the upper surface of lower conveyor 64 are moving upwardly and rearwardly at high speeds as the bale 136 enters the space between such surfaces, as soon as the slow moving bale 136 makes engaging contact with the belts 76 and 92, a reaction force is generated that is opposite in direction to the direction of movement of the bale 136. Although such reaction force has no significant effect upon the lower conveyor 64, it does cause a response in the upper conveyor 66, to wit, the upper conveyor 66 immediately shifts in the direction of the reaction force, i.e., generally back toward the baler 10. Inasmuch as the relationship between the conveyors 64 and 66 is one of a four-bar linkage, however, the responsive movement of the upper conveyor 66 is caused to be swinging in nature as the links 120 pivot counterclockwise about their pivots 122 as shown in FIG. 4 and the links 104 likewise pivot counterclockwise about their pivots 108. Because the distance between points 122 and 126 of the links 120 is relatively short, a substantial portion of the arcuate movement of upper conveyor 66 is devoted to displacement of the latter toward the lower conveyor 64 such that the upper conveyor 66 effectively clamps down against the entering hole 136 such that the thrower 14 firmly grabs ahold of the same.

With the two conveyors 64 and 66 thereby firmly grabbing the bale 136, the impelling surfaces of their corresponding belts 76 and 92 cooperate to thrust the bale 136 upwardly and rearwardly without significant slippage so that the bale is propelled through and beyond the thrower 14 in the manner illustrated in FIG. 4. Thereupon, the spring 130 immediately returns the upper conveyor 66 to its normal condition in preparation for receiving the next bale.

It is worthy of note that the stops 128 should preferably be positioned in such a way that the spring 130 is not allowed to move the pivots 126 in a clockwise direction beyond a "top dead center" relationship with the pivots 122, said top dead center relationship occurring when an imaginary line interconnecting the pivots 122 and 126 is perpendicular to the lower belt 76. Consequently, the initial reaction of the upper conveyor 66 to the drag imparted by the incoming bale will be a downward and inward clamping action toward the bale as opposed to an outward and upward releasing action such as would be the case if the normal standby positions of the links 120 were displaced somewhat clockwise from their FIG. 3 position.

We claim:

1. A bale thrower adapted for attachment to the discharge end of a baler for receiving bales successively issuing therefrom and for throwing the same in succession into a remote receptacle or the like, said thrower comprising:

a pair of opposed conveyors located on opposite sides of the normal path of travel of bales through the thrower and defining a bale entrance and a bale exit of the thrower, said conveyors being provided with respective bale-engaging surfaces driven in directions corresponding to the direction of bale travel from said entrance to said exit; and means mounting said conveyors for relative shifting thereof toward one another in an area that includes said entrance in response to entry of a bale into the entrance and engagement of the bale with said surfaces whereby to clamp the conveyors about the entering bale as said surfaces cooperate to propel the bale along said path of travel.

2. A bale thrower as claimed in claim 1, wherein said conveyors are provided with means yieldably resisting said relative shifting.

3. A bale thrower as claimed in claim 2, wherein one of said conveyors is stationary during said shifting and the other is movable toward said stationary conveyor during said shifting, there being a stop at one limit of travel of the movable conveyor corresponding to an unshifted position of the movable conveyor, said yieldable means being operable to bias said movable conveyor toward said stop.

4. A bale thrower as claimed in claim 1, wherein said mounting means includes a pair of swingable links spaced apart along said path of travel and each swingably interconnecting said conveyors for relative bodily displacement thereof both along said path of travel and across said path of travel during said shifting.

5. A bale thrower as claimed in claim 4, wherein one of said conveyors is stationary and the other is movable for effecting said shifting of the conveyors by said movable conveyor swinging generally toward said stationary conveyor, said swinging of the movable conveyor being generally opposite to the direction of driving movement of said conveyor surfaces and generally toward the stationary conveyor.

6. A bale thrower as claimed in claim 5, wherein said movable conveyor is provided with means yieldably resisting said swinging thereof.

7. A bale thrower as claimed in claim 6, wherein said movable conveyor is provided with a stop at one limit of swinging thereof corresponding to an unshifted position of the movable conveyor, said yieldable means biasing said movable conveyor toward said stop.

8. A bale thrower as claimed in claim 1, wherein said mounting means includes a four-bar linkage swingably interconnecting the conveyors for relative bodily displacement thereof both along said path of travel and across said path of travel during said shifting, said mounting means further including means yieldably biasing the conveyors toward a relatively spaced, unshifted condition.

* * * * *